B. BLACK AND A. COOK.
BICYCLE PUMP.
APPLICATION FILED OCT. 30, 1917.
1,319,137.
Patented Oct. 21, 1919.
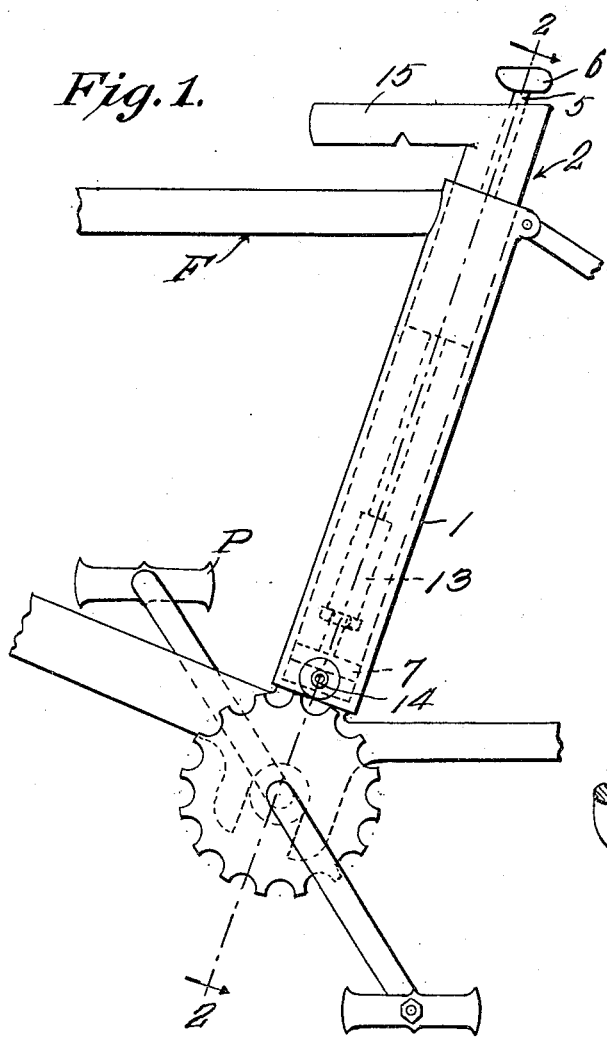
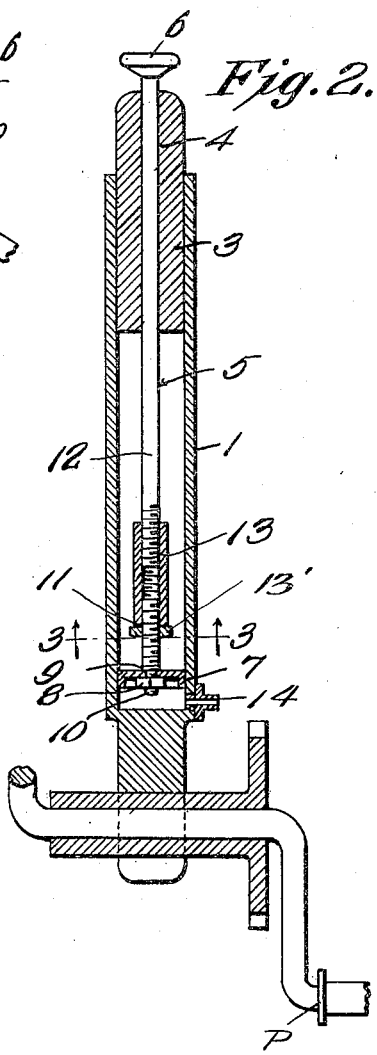
INVENTOR
Albert Cook,
and Benjamin Black,
By Richard Bowen,
ATTORNEY
WITNESSES
James F. Crown,
S. M. McColl,

UNITED STATES PATENT OFFICE.

BENJAMIN BLACK AND ALBERT COOK, OF BROOKLYN, NEW YORK.

BICYCLE-PUMP.

1,319,137.　　　　Specification of Letters Patent.　　Patented Oct. 21, 1919.

Application filed October 30, 1917.　Serial No. 199,333.

*To all whom it may concern:*

Be it known that we, BENJAMIN BLACK and ALBERT COOK, citizens of the United States, residing at Brooklyn, in the county of Kings and State of New York, have invented certain new and useful Improvements in Bicycle-Pumps, of which the following is a specification.

This invention relates to pneumatics and more particularly to pumps.

The object of the invention is to so construct a bicycle pump that it will form a part of the supporting frame of the vehicle and be always in convenient position for operation and thereby perform the double function of a frame member and an inflating device.

Another object is to so construct a device of this class that the plunger rod may be adjustable to permit the height of the seat post to be varied.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a portion of a bicycle frame showing this improved pump applied, Fig. 2 is a vertical section taken on the line 2—2 of Fig. 1, and Fig. 3 is a transverse section taken on the line 3—3 of Fig. 2.

In the embodiment illustrated a bicycle frame F of ordinary construction is shown having the usual upright seat supporting standard 1 which is usually and is here shown made hollow as are the remaining members of the frame to provide for lightness. This hollow upright 1 is cylindrical in form, being closed at its lower end and open at its upper end, the lower end supporting the pedals P in the usual manner. A substantially L-shaped seat post 2 is mounted on and forms a closure for the upper end of the cylinder 1. The upright member 3 of this seat post has a bore 4 extending longitudinally therethrough to receive a piston rod 5. This piston rod 5 has a hand grip 6 at its upper end such as is usual in devices of this character and mounted thereon within the cylinder is a piston 7 which may be of any suitable or desired construction, being here shown in the form of a leather washer secured to the rod 5 by a nut 8 between which and a shoulder 9 on said rod it is clamped, the end 10 which carries said piston being here shown reduced. This piston rod 5 is made in two sections 11 and 12 the adjacent ends of which are threaded and connected by an internally threaded sleeve 13 which provides for the adjustment of the length of the piston rod 5 so that the seat post 2 may be varied in height, a jam nut 13' being applied to the section 11 and engaged against the sleeve 13 to secure the parts against relative movement.

A hose connection in the form of a nipple 14 of ordinary construction is carried by the lower end of the pump cylinder and with which the hose which connects the pump with the tire to be deflated is designed to be connected, said hose not being here shown.

When the seat, not shown, is in position on the horizontal arm 15 of the seat post, the head or hand grip 6 of the piston rod 5 will be disposed at the rear of the seat in convenient position for operation when the pump is to be used.

It will thus be seen that by so constructing the frame member 1 it performs the double function of a pump cylinder and of a seat support as well as one of the connections of the bicycle frame.

When it is desired to use the pump all that is necessary is to attach the hose, not shown, to the nipple 14, and then reciprocate the piston in the usual manner, compressing and forcing out air to the tire to be inflated.

From the foregoing description, taken in connection with the accompanying drawings, the advantages of the construction and of the method of operation will be readily apparent to those skilled in the art to which the invention appertains and while we have described the principle of operation of the invention together with the device which we now consider to be the best embodiment thereof, we desire to have it understood that the device shown is merely illustrative and that such changes may be made as are within the scope of the claimed invention.

We claim:—

In combination, a tubular rear upright member of a bicycle frame, said tubular member having an opening at its lower end, a hose connection inserted in said opening, a seat post inserted in the upper end of said tubular member and having a central opening extending therethrough, a headed rod operating in said opening of the seat post, said rod having its lower end threaded, a sleeve engaged upon the threaded end of said rod, a threaded member engaged on the opposite end of said sleeve, a jam nut engaged upon said second member to bear against the sleeve to retain the parts against relative movement, said second threaded member having a reduced lower end, a piston applied to said reduced end, and a nut engaged upon said reduced end to secure the piston in place.

In testimony whereof we affix our signatures in presence of two witnesses.

BENJAMIN BLACK.
ALBERT COOK.

Witnesses:
Jos. SOLOTOVSKY,
G. LOEHMAN.

Copies of this patent may be obtained for five cents each, by addressing the "Commissioner of Patents, Washington, D. C."